US007801185B2

(12) United States Patent
Krzyzanowski

(10) Patent No.: US 7,801,185 B2
(45) Date of Patent: Sep. 21, 2010

(54) DEVICE CONTROL SYSTEM, METHOD, AND APPARATUS FOR SERVER-BASED OR PEER-TO-PEER NETWORK ENVIRONMENTS

(75) Inventor: Paul Krzyzanowski, Fanwood, NJ (US)

(73) Assignee: OpenPeak Inc., Boca Raton, FL (US)

( * ) Notice: Subject to any disclaimer, the term of this patent is extended or adjusted under 35 U.S.C. 154(b) by 1027 days.

(21) Appl. No.: 11/529,605

(22) Filed: Sep. 29, 2006

(65) Prior Publication Data

US 2007/0019683 A1  Jan. 25, 2007

Related U.S. Application Data

(62) Division of application No. 10/782,764, filed on Feb. 23, 2004, now Pat. No. 7,154,862.

(60) Provisional application No. 60/533,219, filed on Dec. 31, 2003.

(51) Int. Cl.
*H04J 3/12* (2006.01)
(52) U.S. Cl. ........................................ 370/522; 709/220
(58) Field of Classification Search .................. 370/310, 370/522; 709/220, 223
See application file for complete search history.

(56) References Cited

U.S. PATENT DOCUMENTS 5,167,035 A * 11/1992 Mann et al. ..................... 714/4

| 6,687,318 | B1 | 2/2004 | Kaup et al. |
| 6,910,068 | B2 | 6/2005 | Zintel et al. |
| 7,099,723 | B2 | 8/2006 | Gonzales et al. |
| 7,184,707 | B2 | 2/2007 | Tada et al. |
| 2004/0243694 | A1 | 12/2004 | Weast |
| 2005/0125081 | A1 | 6/2005 | Ota et al. |
| 2007/0296552 | A1 * | 12/2007 | Huang et al. ............... 340/10.5 |

FOREIGN PATENT DOCUMENTS

| JP | 2000194543 | 7/2000 |
| WO | 0177764 A2 | 10/2001 |
| WO | 2004107658 A1 | 12/2004 |

OTHER PUBLICATIONS

International Search Report and The Written Opinion of the ISA, issued in International Appl. No. PCT/US04/28471 on Apr. 6, 2006, 10 pages.

* cited by examiner

*Primary Examiner*—Kevin C Harper
(74) *Attorney, Agent, or Firm*—Fiala & Weaver P.L.L.C.

(57) ABSTRACT

In a device control system that provides a means for controlling a variety of device types via a unified interface, such as via a handheld controller, a synchronization protocol ensures synchronization between a plurality of such controllers in a peer-to-peer network environment, provides a means for transferring custom configurations between such controllers, and provides a means for migrating such a controller from a peer-to-peer network environment to a server-based network environment and vice-versa.

26 Claims, 7 Drawing Sheets

DEVICE CONTROL SYSTEM, METHOD, AND APPARATUS FOR SERVER-BASED OR PEER-TO-PEER NETWORK ENVIRONMENTS

CROSS-REFERENCE TO RELATED APPLICATIONS

This application is a divisional application of U.S. patent application Ser. No. 10/782,764, filed Feb. 23, 2004, which claims priority to U.S. Provisional Patent Application No. 60/533,219, filed Dec. 31, 2003. The entireties of each of these applications are incorporated by reference herein.

BACKGROUND OF THE INVENTION

1. Field of the Invention

The present invention is generally directed to device control. In particular, the present invention relates to a system, method and apparatus for controlling electronic devices in a server-based or peer-to-peer network environment.

2. Background

An ever-increasing number and variety of remotely-controllable electronic devices are being utilized in home and office environments. Such devices include electronic devices adapted for control via a wired or wireless network, such as devices that comply with the UPnP™ protocol, as well as legacy consumer electronic devices adapted for control by handheld remotes implementing infrared (IR) or serial command codes.

Conventional device control solutions do not provide a means for controlling the foregoing device types via a unified interface, such as via a single handheld controller. Moreover, conventional device control solutions do not provide a means for ensuring synchronization between a plurality of such controllers in a peer-to-peer network environment, a means for transferring custom configurations between such controllers, or a means for migrating such a controller from a peer-to-peer network environment to a server-based network environment and vice-versa.

BRIEF SUMMARY OF THE INVENTION

The invention disclosed herein is used in a device control system that provides a means for controlling a variety of device types via a unified interface, such as via a handheld controller. In accordance with the present invention, a synchronization protocol ensures synchronization between a plurality of such controllers in a peer-to-peer network environment, provides a means for transferring custom configurations between such controllers, and provides a means for migrating such a controller from a peer-to-peer network environment to a server-based network environment.

In particular, an embodiment of the present invention provides a method for synchronizing a first controller with a second controller, each of the first and second controllers being adapted to remotely control one or more electronic devices. The method includes discovering the second controller, generating first controller synchronization data for synchronizing the first and second controllers, and transmitting a message relating to the first controller synchronization data to the second controller. First controller synchronization data may be generated in response to the execution of a command that changes a configuration, status and/or operation of one of the one or more electronic devices, in response to the execution of a command that changes a control configuration of the first controller, or in response to a detected change in configuration, status and/or operation of at least one of the one or more electronic devices.

In another embodiment of the present invention, an apparatus for remotely controlling one or more electronic devices is provided. The apparatus includes a network interface adapted for communication over a network, a user interface adapted to receive user input, and control logic coupled to the network interface and the user interface and adapted to execute commands in response to the user input. The control logic is further adapted to discover a second apparatus for controlling the one or more electronic devices communicatively coupled to the network, to generate synchronization data for synchronizing the apparatus with the second apparatus, and to transmit a message relating to the synchronization data to the second apparatus via the network interface. Synchronization data may be generated in response to the execution of a command that changes a configuration, status and/or operation of one of the one or more electronic devices, in response to the execution of a command that changes a control configuration of the apparatus, or in response to a detected change in configuration, status and/or operation of at least one of the one or more electronic devices.

In a further embodiment of the present invention, a system for device control is provided. The system includes an electronic device and first and second controllers communicatively coupled to the electronic device and each other via a network, such as a wireless network. Each of the first and second controllers is adapted to remotely control the electronic device via the network. The first controller is further adapted to discover the second controller, to generate first controller synchronization data for synchronizing the first and second controllers, and to transmit a message relating to the first controller synchronization data to the second controller over the network. First controller synchronization data may be generated in response to the execution of a command that changes a configuration, status and/or operation of the electronic device, in response to the execution of a command that changes a control configuration of the first controller, or in response to a detected change in configuration, status and/or operation of the electronic device.

In an additional embodiment of the present invention, a method for synchronizing a first controller with a second controller is provided, wherein each of the first and second controllers are adapted to remotely control one or more electronic devices. The method includes discovering the second controller, transmitting first data to the second controller relating to one or more first controller events that have occurred since a prior synchronization, and receiving second data from the second controller relating to one or more second controller events that have occurred since the prior synchronization. The method may also include updating a log of events based on the first and second data, which may further entail comparing data relating to a first controller event with data relating to a second controller event and, if the data relating to the first controller event conflicts with the data relating to the second controller event, updating the log of events only if a timestamp associated with the first controller event is earlier than a timestamp associated with the second controller event. The method may further include changing a control configuration of the first controller to match a control configuration of the second controller based on the second data.

In another embodiment, an apparatus for remotely controlling one or more electronic devices is provided. The apparatus includes a network interface adapted for communication over a network, a user interface adapted to receive user input, and control logic coupled to the network interface and the user interface and adapted to execute commands in response to the user input. The control logic is further adapted to discover a second apparatus for controlling the one or more electronic devices communicatively coupled to the network, to transmit first data to the second apparatus relating to one or more first controller events that have occurred since a prior synchronization, and to receive second data from the second apparatus relating to one or more second controller events that have occurred since the prior synchronization. The control logic may be further adapted to update a log of events stored in a memory based on the first and second data, which may further entail comparing data relating to a first controller event with data relating to a second controller event and, if the data relating to the first controller event conflicts with the data relating to the second controller event, updating the log of events only if a timestamp associated with the first controller event is earlier than a timestamp associated with the second controller event. The control logic may also be further adapted to change a control configuration of the apparatus to match a control configuration of the second apparatus based on the second data.

In a further embodiment, a system for device control is provided. The system includes an electronic device and first and second controllers communicatively coupled to the electronic device and to each other via a network, such as a wireless network. Each of the first and second controllers is adapted to remotely control the electronic device via the network. The first controller is further adapted to discover the second controller, to transmit first data to the second controller relating to one or more first controller events that have occurred since a prior synchronization, and to receive second data from the second controller relating to one or more second controller events that have occurred since the prior synchronization. The first controller may be further adapted to update a log of events based on the first and second data, which may further entail comparing data relating to a first controller event with data relating to a second controller event and, if the data relating to the first controller event conflicts with the data relating to the second controller event, updating the log of events only if a timestamp associated with the first controller event is earlier than a timestamp associated with the second controller event. The first controller may also be further adapted to change a control configuration of the first controller to match a control configuration of the second controller based on the second data.

In an additional embodiment, a method for migrating a controller adapted to remotely control one or more electronic devices from a stand-alone mode to a client-server mode is provided. Initially, the controller remotely controls the one or more electronic devices in accordance with a control configuration maintained by the controller in a stand-alone mode. The method includes discovering a server, transmitting data to the server relating to the control configuration maintained by the controller, and subsequently controlling the one or more electronic devices in accordance with a control configuration maintained by the server.

In another embodiment, an apparatus for remotely controlling one or more electronic devices is provided. The apparatus includes a network interface adapted for communication over a network, a user interface adapted to receive user input, and control logic coupled to the network interface and the user interface and adapted to execute commands in response to the user input. The control logic is further adapted to discover a server communicatively coupled to the network, to transmit data to the server relating to a control configuration maintained by the apparatus, and to subsequently control the one or more electronic devices in accordance with a control configuration maintained by the server instead of in accordance with the control configuration maintained by the apparatus.

In a further embodiment, a device control system is provided. The system includes an electronic device, a controller communicatively coupled to the electronic device via a network, such as a wireless network, the controller adapted to remotely control the electronic device via the network, and a server communicatively coupled to the electronic device and the controller via the network. The controller is further adapted to discover the server, to transmit data to the server relating to a control configuration maintained by the controller, and to subsequently control the electronic device in accordance with a control configuration maintained by the server instead of in accordance with the control configuration maintained by the controller.

In an additional embodiment, a method for migrating a controller adapted to remotely control one or more electronic devices from a client-server mode to a stand-alone mode is provided. Initially, the controller remotely controls the one or more electronic devices in accordance with a control configuration maintained by a server. The method includes receiving data from the server relating to the control configuration maintained by the server, and subsequently controlling the one or more electronic devices in accordance with a control configuration maintained by the controller.

In another embodiment, an apparatus for remotely controlling one or more electronic devices is provided. The apparatus includes a network interface adapted for communication over a network, a user interface adapted to receive user input, and control logic coupled to the network interface and the user interface and adapted to execute commands in response to the user input. The control logic is further adapted to receive data from a server communicatively coupled to the network relating to a control configuration maintained by the server, and to subsequently control the one or more electronic devices in accordance with a control configuration maintained by the apparatus instead of in accordance with the control configuration maintained by the server.

In a further embodiment, a device control system is provided. The system includes an electronic device, a controller communicatively coupled to the electronic device via a network, such as a wireless network, the controller adapted to remotely control the electronic device via the network, and a server communicatively coupled to the electronic device and the controller via the network. The controller is further adapted to receive data from the server relating to a control configuration maintained by the server, and to subsequently control the electronic device in accordance with a control configuration maintained by the controller instead of in accordance with the control configuration maintained by the server.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE
DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
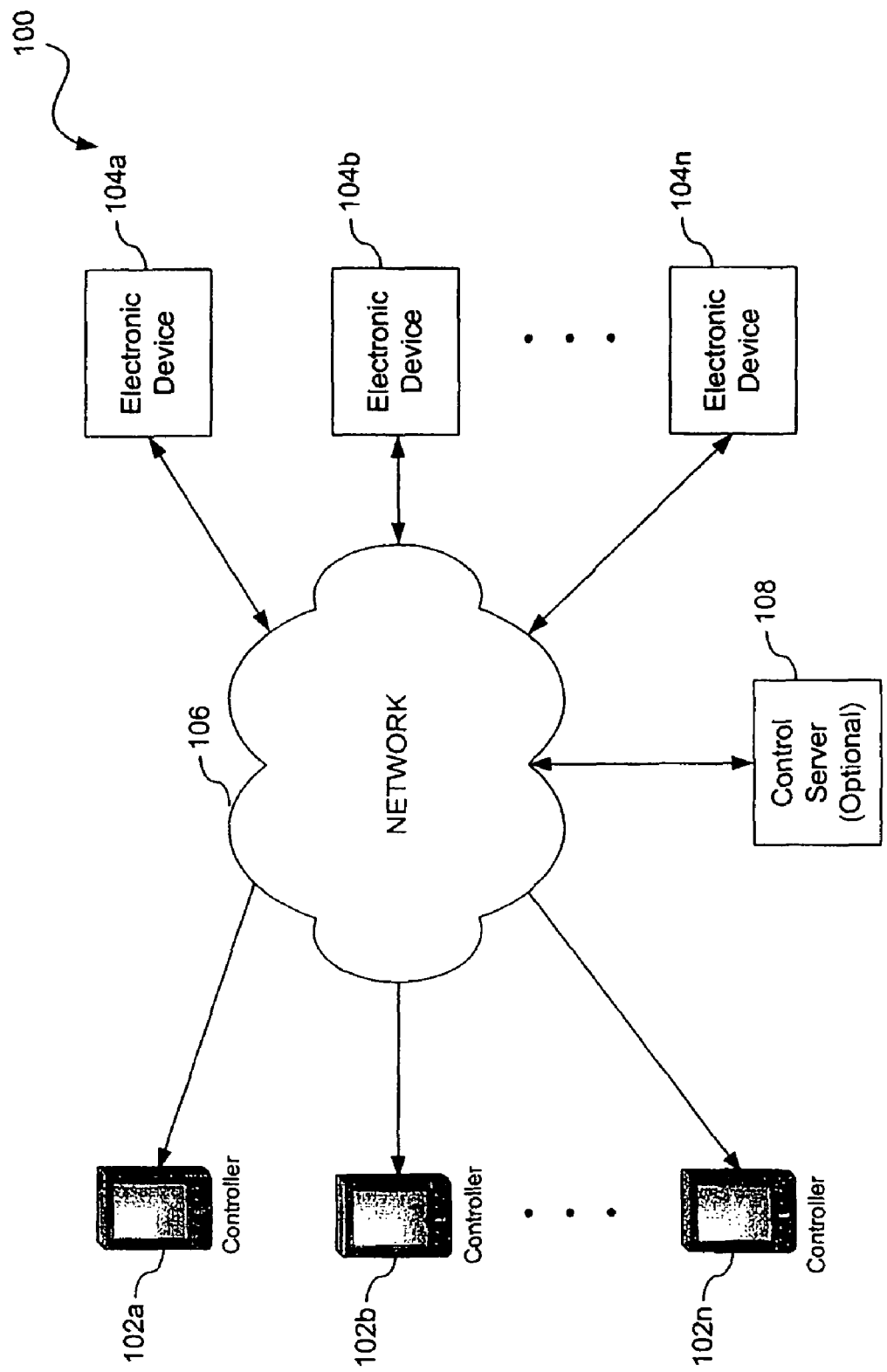
FIG. 1 depicts the elements of a device control system in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Device Control System In Accordance with an Embodiment of the Present Invention FIG. 1 depicts an example device control system 100 in accordance with an embodiment of the present invention. It should be understood that example device control system 100 is shown for illustrative purposes only and does not limit the present invention. Other implementations of example device control system 100 will be apparent to persons skilled in the relevant art(s) based on the teachings contained herein, and the invention is directed to such other implementations.

As shown in FIG. 1, example device control system 100 includes a plurality of controllers 102a through 102n and one or more electronic devices 104a through 104n, each of which is communicatively coupled to a network 106. In one embodiment, network 106 comprises a residential network for communicatively connecting devices within a home. In accordance with such an embodiment, network 106 may comprise, for example, a home phone line network, a home power line network, an Ethernet network, a wireless network, or any combination of the above. However, the invention is not limited to residential networks, and network 106 may comprise any type of residential or non-residential network, including but not limited to a local area network (LAN) or a wide-area network (WAN), such as the Internet.

Each of electronic devices 104a through 104n may comprise one of wide variety of remotely-controllable electronic devices available for use in a residential and/or office environment. For example, each of electronic devices 104a through 104n may comprise one of a computer, a computer peripheral, a television (TV), a video cassette recorder (VCR), a digital versatile disc (DVD) player, a personal video recorder (PVR), a compact disc (CD) player, a stereo receiver, an electronic thermostat, a UPnP™ digital media renderer and/or server, a lamp, or a video camera. However, these examples are not intended to be limiting, and other electronic devices are within the scope and spirit of the present invention.

Each of controllers 102a through 102n is adapted to remotely control one or more of electronic devices 104a through 104n. In particular, and as will be discussed in more detail herein, each of controllers 102a through 102n provides a user-configurable, universal interface for controlling a variety of electronic devices, each of which may have a different manufacturer and/or model type and each of which may support a different communication protocol for remote device control.

In accordance with an embodiment of the present invention, each of controllers 102a through 102n comprises a stand-alone interface for controlling the one or more electronic devices 104a-104n. In an alternate embodiment, each of controllers 102a through 102n operates in conjunction with an optional control server 108, which is communicatively coupled to the controllers and the electronic device(s) via network 106, to perform electronic device control functions. A detailed example of a control server, controllers, and a network that provides for remote command and control of devices and applications in residential or non-residential environment may be found in commonly owned, co-pending U.S. patent application Ser. No. 10/180,500, entitled "Method, System, and Computer Program Product for Managing Controlled Residential or Non-residential Environments," filed Jun. 27, 2002, the entirety of which is incorporated by reference herein.

Figure 2:
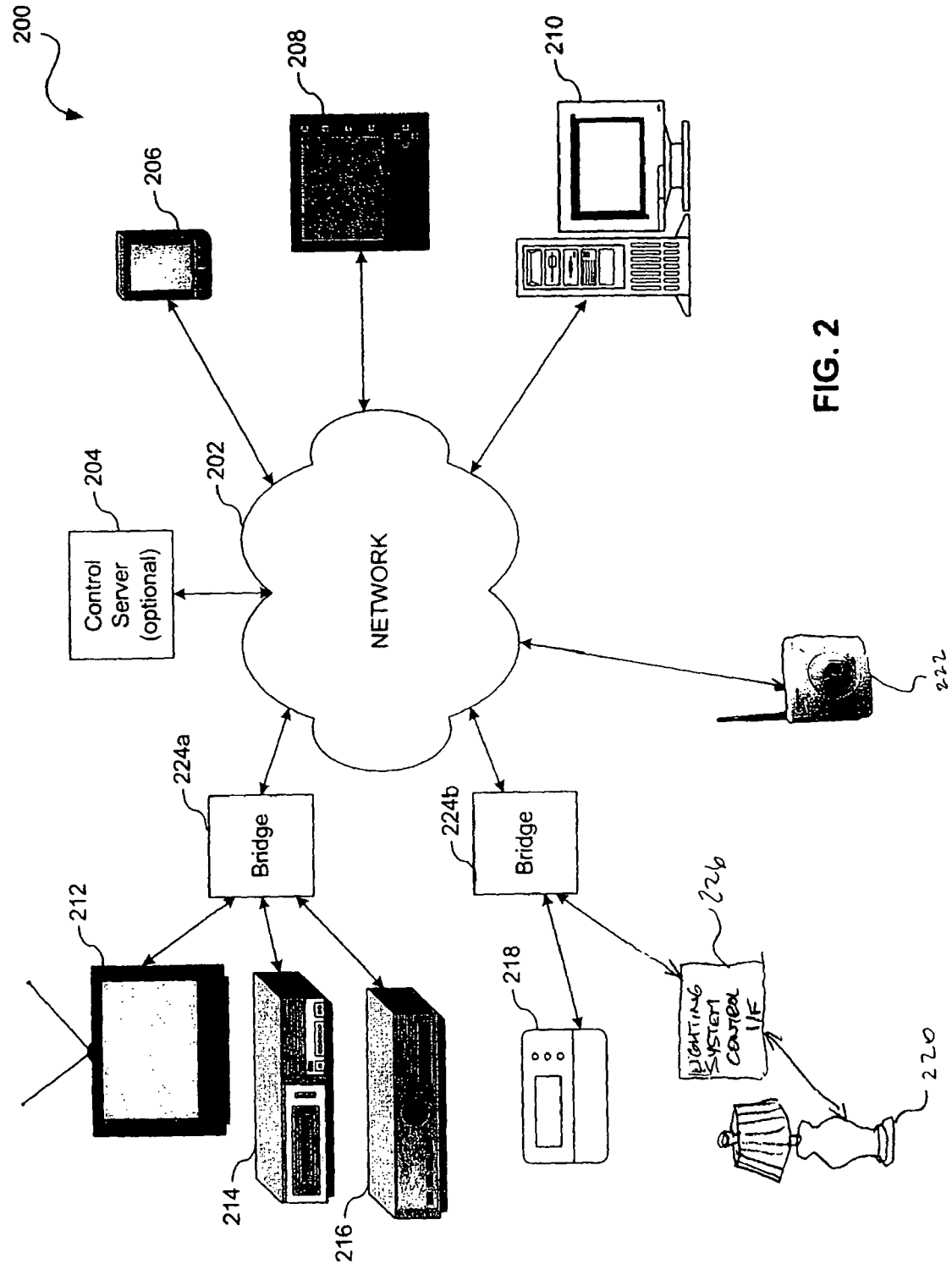
FIG. 2 illustrates a particular implementation of a device control system in accordance with an embodiment of the present invention.

FIG. 2 depicts a particular implementation of a device control system 200 in accordance with an embodiment of the present invention. Various elements of device control system 200 are described in more detail in commonly owned, co-pending U.S. patent application Ser. No. 10/387,590 entitled "Legacy Device Bridge for Residential or Non-Residential Networks" to Krzyzanowski et al., filed Mar. 14, 2003, the entirety of which is incorporated by reference as if set forth fully herein.

As shown in FIG. 2, device control system 200 includes a plurality of electronic devices communicatively coupled to a network 202, which in an embodiment comprises a wireless LAN. Electronic devices such as a personal digital assistant (PDA) 206, a tablet PC 208, a PC-based computer system 210, and a network-ready video camera 222 are adapted for communication in accordance with a packet-based communication protocol, such as TCP/IP. Legacy consumer electronic devices, including a TV 212, a VCR and/or DVD player 214, a stereo receiver 216, an electronic thermostat 218, and a lamp 220 and associated lighting system control interface 226 are not so adapted must rely on infrared (IR) or serial communication protocols for communication purposes. Legacy device bridges 224a and 224b perform a protocol conversion function that facilitates communication between those devices that use a packet-based communication protocol and those that rely exclusively on IR or serial communication protocols.

In FIG. 2, each of PDA 206, tablet PC 208, or PC-based computer system 210 may comprise a controller for remotely controlling one or more of the other electronic devices coupled to network 202. Furthermore, in accordance with an embodiment of the present invention, a plurality of PDAs 206, tablet PCs 208, or PC-based computer systems 210, may be used to provide stand-alone control over one or more of the other electronic devices coupled to network 202. Alternatively, these controllers may operate in conjunction with an optional control server 204 to perform remote device control functions.

Figure 3:
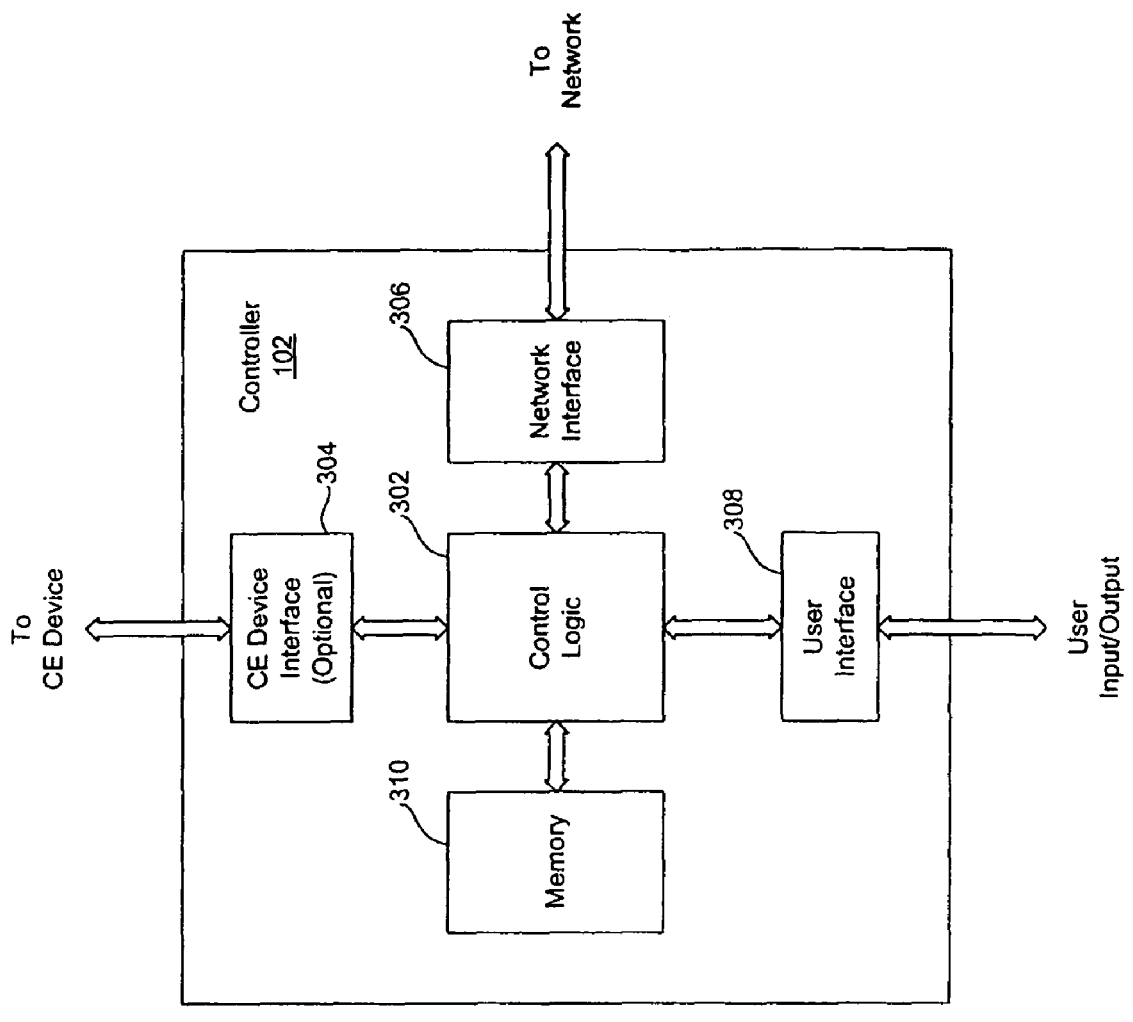
FIG. 3 depicts an example controller implementation in accordance with an embodiment of the present invention.

B. Controller Implementation In Accordance with an Embodiment of the Present Invention FIG. 3 illustrates an example implementation of one of controllers 102a through 102n (also generically referred herein to as controller 102) in accordance with an embodiment of the present invention. It should be understood that the example implementation depicted in FIG. 3 is provided for illustrative purposes only and does not limit the present invention. Other implementations of controller 102 will be apparent to persons skilled in the relevant art(s) based on the teachings contained herein, and the invention is directed to such other implementations.

As shown in FIG. 3, controller 102 includes a user interface 308 for receiving user input and providing information to a user, a network interface 306 for providing access to a network, and an optional consumer electronic (CE) device interface 304 for transmitting information to, and optionally receiving information from, a CE device. In an embodiment, user interface 308 comprises a graphical user interface (GUI) that receives user input via a touch-sensitive display, network interface 306 comprises a plug-in or built-in transceiver adapted for network communication in accordance with a communications protocol, such as the IEEE 802.11b, Bluetooth™ or Ethernet protocol, and optional CE device interface 304 comprises a one-way IR transmitter or, alternately, a two-way IR transceiver.

As shown in FIG. 3, controller 102 further includes control logic 302, which is communicatively coupled to user interface 308, network interface 306, and optional CE device interface 304. Control logic 302 is adapted to execute features of the present invention as will be described in more detail herein, including but not limited to performing a synchronization protocol with one or more other controllers while operating in a peer-to-peer mode, and performing functions related to migration from a peer-to-peer mode to a client-server mode of operation. As will be appreciated by persons skilled in the relevant art(s) based on the teachings provided herein, control logic 302 may be readily implemented using one or more multi-purpose processor(s), application specific integrated circuits, or a combination of the foregoing.

Controller 102 also includes a memory 310 that is communicatively coupled to control logic 302. In an embodiment, memory 310 may comprise static memory, such as read-only memory (ROM), dynamic memory, such as random access memory (RAM), a hard disk drive, or any combination of the foregoing. In accordance with an embodiment of the invention, memory 310 stores a plurality of software libraries containing applications and data for respective execution and processing by control logic 302.

In an embodiment of the present invention, controller 102 comprises one of a PDA, a tablet computer, a web-pad, or a personal computer, although the invention is not so limited.

Figure 4:
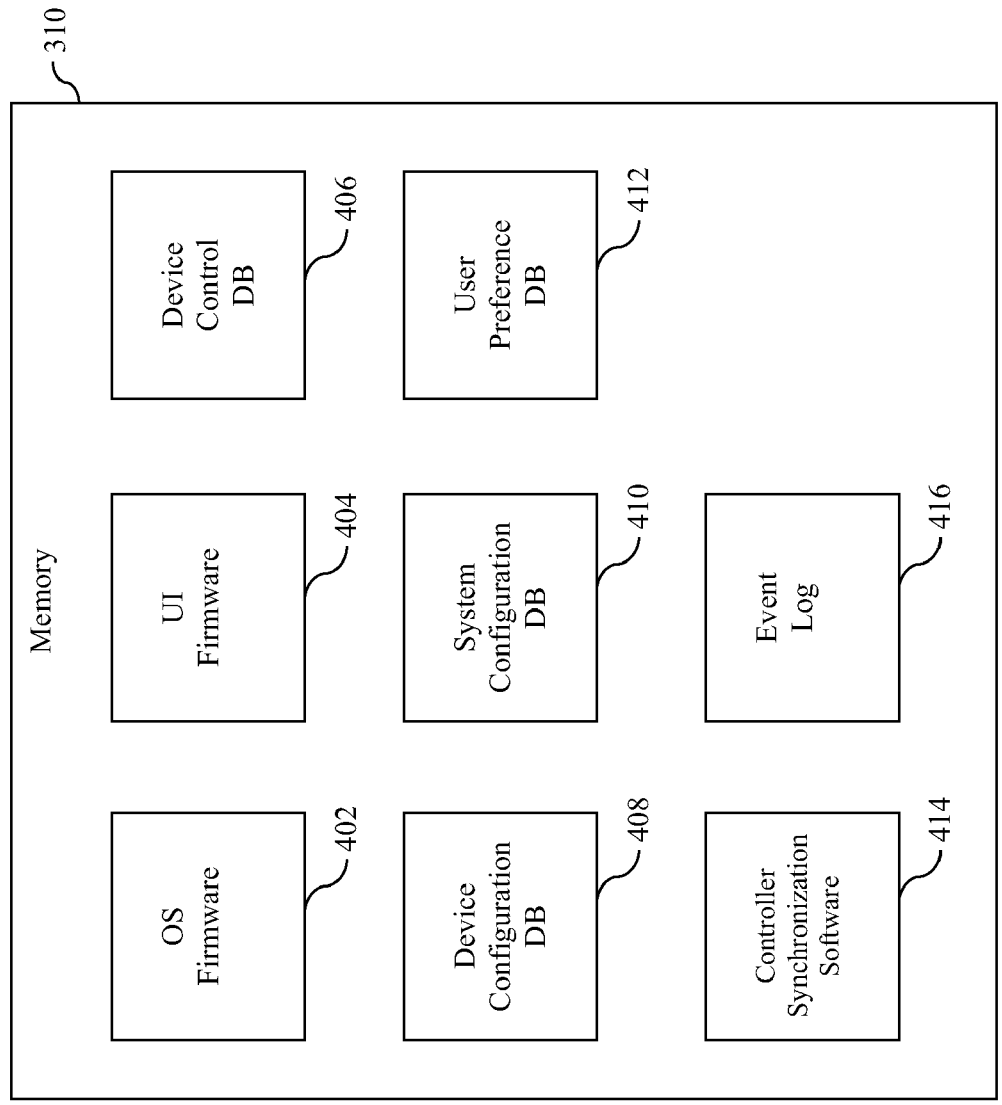
FIG. 4 is a conceptual representation of various software libraries that may be stored by a controller in accordance with an embodiment of the present invention.

FIG. 4 is a conceptual representation of the various software components or libraries that may be stored in memory 310 in accordance with an embodiment of the present invention. As shown in FIG. 4, such components include operating system firmware 402, user interface firmware 404, a device control database 404, a device configuration database 408, a system configuration database 410, a user preferences database 412, controller synchronization software 414, and an event log 416. Each of these components will be discussed below.

Operating system firmware 402, when executed, provides a platform upon which other controller applications may run, and performs basic functions, such as functions relating to controller input/output (I/O) and file management. User interface firmware 404, when executed, provides for the implementation and management of various programmable aspects of user interface 308.

Device control database 406 stores sets of predefined commands and codes for remotely controlling a variety of electronic devices, as well as metadata relating to unique control behaviors of such devices. In an embodiment of the present invention, controller 102 may download device command codes and metadata via network 106 for storage in device control database 406. A detailed description of such functionality is provided in U.S. Provisional Patent Application Ser. No. 60/505,851 entitled "Device Control System, Method and Apparatus" to Krzyzanowski et al., filed Sep. 26, 2003, the entirety of which is incorporated by reference as if set forth fully herein. Such command codes and metadata may be obtained, for example, from libraries stored on CD-ROMs, downloaded via network 106 as discussed above, or "learned" through prompted interaction with an end user or by experience (for example, analysis of prior user control methods).

Software libraries 408, 410 and 412 generally comprise databases that store information relating to user-customized or personalized aspects of the operation of controller 102 and the overall device control system 100. In particular, device configuration database 408 includes data relating to the devices that have actually been recognized as part of the device control system 100, including device state and other operational information.

System configuration database 410 includes data relating to various aspects of system management, such as user authorization, location management, and device discovery. User authorization settings may be used to selectively permit or prohibit a system user to control a device, or to control devices associated with a particular location. Location management data pertains to the definition of and assignment of devices to one or more rooms or zones of control within device control system 100. Device discovery data is data related to an ability of controller 102 to detect the presence of and maintain state information relating to a device on network 106. For example, a controller 102 in accordance with an embodiment of the present invention can use the UpnP™ protocol, or a proprietary protocol, to automatically discover and obtain state information concerning devices appearing on network 106.

User preferences database 412 includes data relating to various user-identified preferences relating to the operation of controller 102 and controlled devices within device control system 100. User preferences may include, for example, favorite channels for television viewing, or the selection of a particular graphical user interface (GUI), or "skin," for controller 102.

As will be described in more detail herein, controller synchronization software 414 and event log 416 are used by controller 102 to perform a protocol that ensures synchronization between controller 102 and one or more other controllers within device control system 100 when such controllers are operating in a stand-alone, or peer-to-peer mode. Additionally, and as will also will be described in more detail herein, these components may further provide a means for transferring custom configuration information between controller 102 and other controllers, as well as a means for migrating controller 102 from a peer-to-peer network environment to a server-based network environment.

C. Controller Synchronization In a Peer-to-Peer Mode in Accordance with an Embodiment of the Present Invention As noted above, in device control system 100, multiple controllers 102a through 102n may be operated by multiple users to control one or more of the same electronic devices. When these controllers are operated in a stand-alone mode, a need for coordinating the controllers arises. Absent any means to coordinate the operation of the multiple controllers, control chaos would ensue since each controller operates autonomously and independently of each other.

For example, assume that device control system 100 is implemented in a home. A first user, located in an upstairs room, desires to turn off a television located in a basement, which the first user believes was left on. Using a controller 102a, the first user sends a "power on/off" signal to the basement television via network 106. However, if the first user was mistaken in his or her belief regarding the state of the basement TV, perhaps because a second user using a controller 102b had already turned it off, the "power on/off" signal sent by the first user would result in turning the TV on—an operation that has the opposite effect of that which was intended.

Accordingly, in device control system 100, each of controllers 102a through 102n is adapted to communicate with the other controllers to ensure coordinated and efficient operation of one or more electronic devices in a common control area, such as a home or office. As a result, each controller is capable of functioning in a system containing several controllers operated by other users. In a particular embodiment, each controller has direct network connectivity with other controllers operating in a certain control environment and synchronizes with such other controllers.

In order to perform this synchronization, each of controllers 102a through 102n maintains a log 416 of time-stamped events (see FIG. 4). Each event comprises a notation of an addition, modification, or deletion of some system state. In an embodiment, overall system state is divided into various subcategories. These subcategories may include:

(1) User settings: state information relating to user-defined parameters including but not limited to the adding or removing of users, changing of passwords, identification of favorite channels for TV viewing, the selection of a particular controller GUI (or "skin"), and the like;

(2) Device modules: state information relating to control parameters for a particular device, including but not limited to additions, deletions, or changes to a device template, a device driver, or a device code database (as used herein, the term "device template" refers to parameters relating to device behavior and the term "device driver" refers to software necessary for communicating with a particular device; as discussed above, the device code database contains control code mappings for the device, such as IR or serial codes); and (3) Configuration: state information relating to customized system or device configuration parameters including but not limited to additions, deletions or changes to device room assignment, room definitions, device configuration and connectivity.

As each event is entered into the event log 416, it is associated with a time stamp, indicating the time at which the event occurred.

State changes refer to events that a system in accordance with the present invention keeps track of and propagates for synchronization purposes. For devices, such state changes may involve changes to state variables, control codes, and scripts for guiding device control. State variables may include input selection (for example, a receiver may be set to accept input from a DVD player), on/off state (for example, a TV may be on), or tuner selection (for example, a TV is set to channel 3). Control codes are those codes used to control configured devices, such as IR control codes for remote operation of a consumer electronic device. Although these are typically static, such codes must be propogated to a controller the first time a device is introduced to the system, and there also may be a time when a controller is required to re-learn a particular set of control codes. Scripts for guiding device control refer to scripts, such as XML scripts, for defining device functions, keeping track of state variables, and passing control codes to an appropriate control module (for example, transmitting IR codes to a specific legacy device bridge).

State changes may further involve changes to scripts defining experiences. For example, in an embodiment of the present invention, controls within an experience (such as watching a DVD or listening to a CD) are defined by scripts, or macros, that are generated from basic templates based on a user's responses during a question and answer protocol that occurs during a setup process. For example, in the context of watching a DVD, the macro "ON" might be defined to be: "turn TV on," "turn DVD player on," "turn receiver on," "set receiver to DVD input," and "set TV to Video2 input." Each of these commands is transmitted to the appropriate device script in response to invoking the macro.

State changes may also include changes to timers, timed actions, triggers, and triggered actions. A timer, or alarm, refers to a time associated with the execution of a particular script (for example, turn a TV off at 11:00 PM). The related script, or timed action, is executed when the alarm time is equal to the real time. A trigger refers to the association of a state variable change with the execution of a particular script (for example, turn of the lights whenever the TV is turned on). The related script, or triggered action, is executed when the monitored state variable changes. In a system in accordance with the present invention, timers, triggers, and related scripts are user-programmable functions. A detailed description of such functionality is provided in commonly-owned U.S. patent application Ser. No. To Be Assigned, entitled "Method, System, and Computer Program Product for Automatically Managing Components within a Controlled Environment," to Krzyzanowski et al., filed concurrently herewith, the entirety of which is incorporated by reference as if fully set forth herein.

State changes may further include changes to various configuration parameters such as definitions of users, rooms, and devices within rooms, access rights of users to rooms and devices, and collections of bitmaps and screen layouts that define the user interface (sometimes referred to as "skins").

Figure 5:
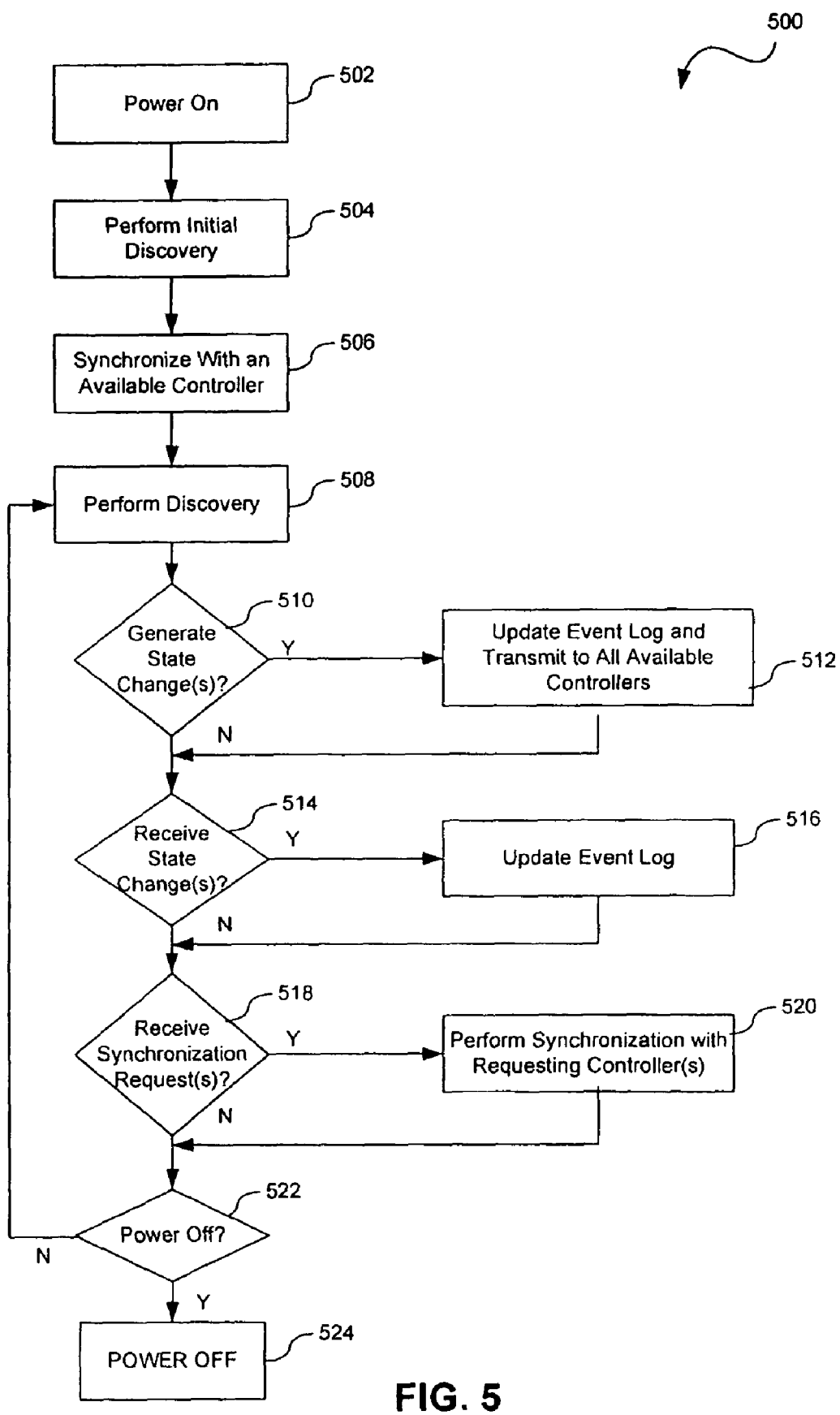
FIG. 5 illustrates a flowchart of a method for synchronizing controllers in a device control system in accordance with an embodiment of the present invention.

FIG. 5 illustrates a flowchart 500 of a method for synchronizing controllers in a device control system in accordance with an embodiment of the present invention. The invention, however, is not limited to the description provided by the flowchart 500. Rather, it will be apparent to persons skilled in the relevant art(s) from the teachings provided herein that other functional flows are within the scope and spirit of the present invention. Flowchart 500 will be described with continued reference to example system 100 described above in reference to FIG. 1. The invention, however, is not limited to this embodiment.

At initial step 502, a user powers on a controller 102a. In response to being powered-on, controller 102a performs an initial discovery protocol 504, by which controller 102a determines if there are other controllers active within device control system 100. At least one manner of implementing this discovery protocol will be provided elsewhere herein.

If there are other controllers available, then controller 102a performs a synchronization protocol 506 with one of the available controllers. Synchronization step 506 is a process by which controller 102a updates its internally stored state, including its event log, by receiving or exchanging state information with another controller in device control system 100. A protocol for performing synchronization step 506 will be provided elsewhere herein. Practically speaking, if more than one other controller is available, it should not matter which of the other controllers is selected for performing synchronization step 506. Consequently, the other controller may be selected arbitrarily. Alternatively, the other controller may be selected on some other basis. For example, the other controller may be selected based on some parameter related to network connectivity, such as an anticipated response time for communicating with the other controller.

After synchronization 506, controller 102a periodically performs a discovery step 508 to determine which other controllers, if any, are currently available on the system, until such time as power down of controller 102a occurs at step 524. In accordance with an embodiment of the present invention, each controller 102a through 102n maintains a table in memory of all known peers (i.e., other controllers). For each peer, the controller stores the time of last synchronization with that peer as well as current connectivity information. For example, current connectivity information may include a network address for the peer, such as an IP address, a time of last discovery, and an indication whether the latest discovery attempt determined that this device was available.

As shown in FIG. 5, in between periodic discovery attempts 508, at least four other events may occur: controller 102a may generate one or more state changes 510, controller 102a may receive one or more state changes from another controller 514, controller 102a may receive a synchronization request for another controller 516, or controller 102a may be powered down 522.

Controller 102a may generate one or more state changes 510 as a result of a user using the controller to change an internal configuration of the controller or to change the configuration of a remotely-controlled electronic device 104a-104n. The controller may also be programmed to change its configuration or the configuration of a remotely-controlled electronic device automatically, such as in response to the occurrence of a particular event or reaching a certain predefined date and time. In either case, event log 416 is updated and the state change information is transmitted to all available controllers in device control system 100, as shown at step 512. In an embodiment, the transmission of state change information includes the transmission of entries from event log 416. As a result of this step, the state of the other available controllers is synchronized with controller 102a shortly after the state change has occurred.

Controller 102a may also receive state change information 514 from other active controllers in device control system 100. This state change information may relate to configuration changes that were applied to either another controller or to a commonly-controlled electronic device. In either case, controller 102a will update its event log 416 based on such received information, as shown at step 516. In an embodiment, the receipt of state change information includes the receipt of entries from the event log of another controller.

Controller 102a may also receive a synchronization request 518 from another active controller in device control system 100, such as an active controller that has been recently powered on. In this case, controller 102a will perform a synchronization protocol with the other controller, an implementation of which will be described in more detail herein, as shown at step 520.

Controller 102a may also be powered down 522 at any time. Power down may be initiated by a user, by internal control logic, such as code for powering down in response to prolonged inactivity, or by another device, such as a network-attached device capable of issuing a system-wide power down or reset command. In any case, this will result in controller 102a entering a power off state 524, thereby terminating the synchronization protocol 500.

Figure 6:
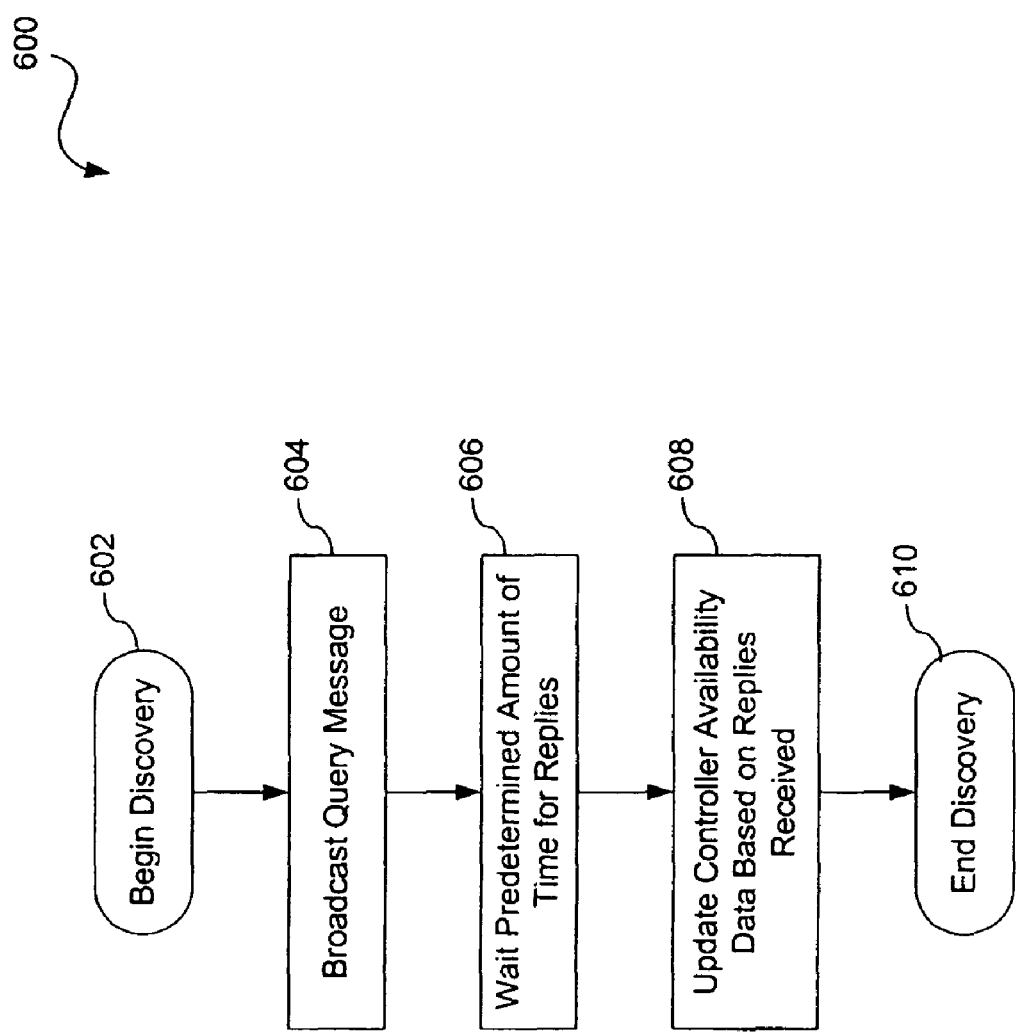
FIG. 6 illustrates a flowchart of a method for discovering other controllers in a device control system in accordance with an embodiment of the present invention.

FIG. 6 illustrates a flowchart 600 of one method for performing discovery steps 504 and 508 discussed above in reference to FIG. 5. This method is provided by way of example only, and is not limiting. The method is initiated at step 602. At step 604, controller 102a transmits a query message to one or more other controllers via network 106. In an embodiment, controller 102a broadcasts a query message across the network. At step 606, controller 102a waits a predetermined amount of time to receive replies from other controllers that are active and communicatively coupled to network 106. At step 608, controller 608 updates internally-stored data relating to controller availability based on replies received, if any, during step 606. In an embodiment of the present invention, controller 102a performs this step by updating availability data in an internally-stored table of all known peers. At step 610, the discovery protocol is terminated.

Figure 7:
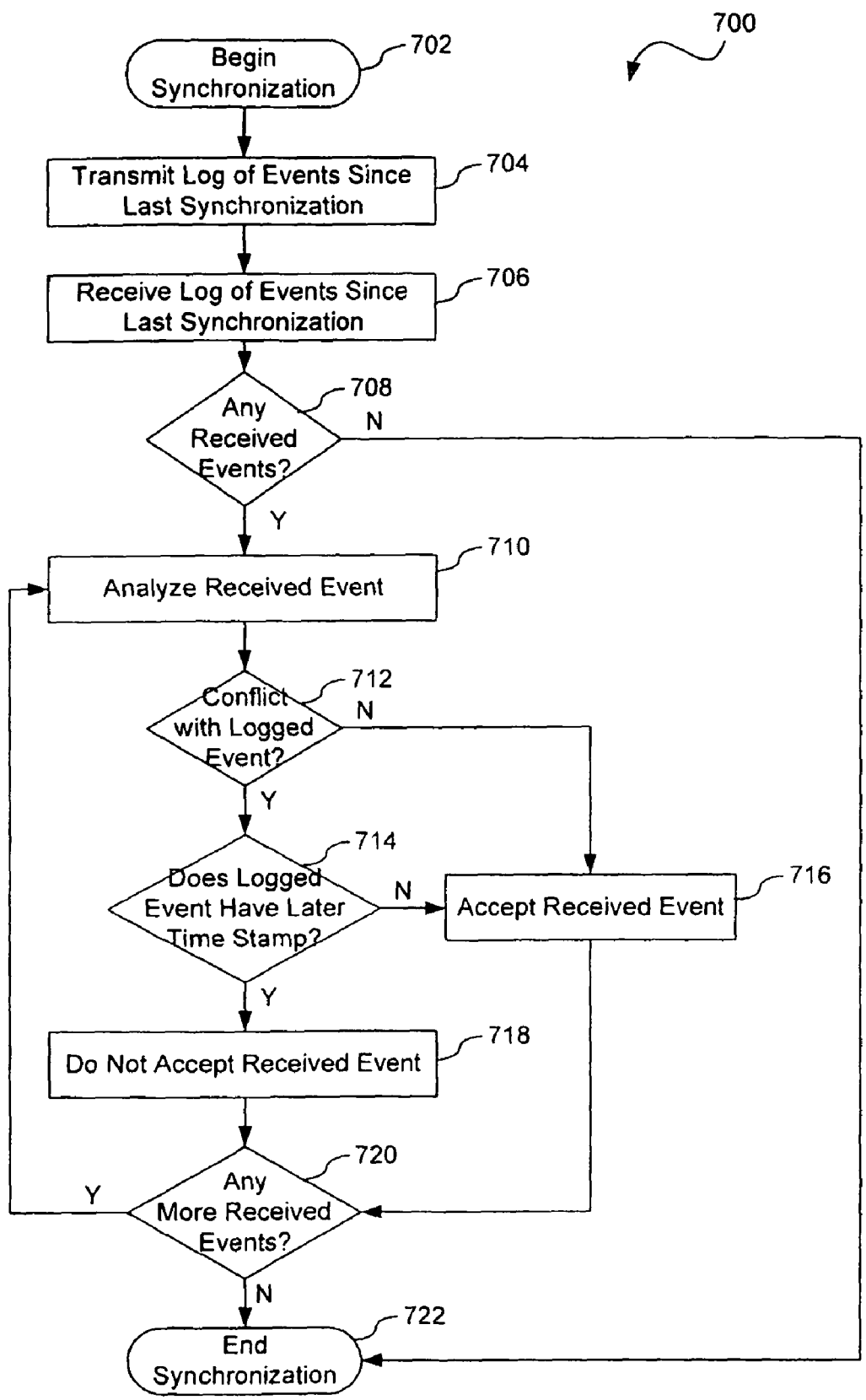
FIG. 7 illustrates a flowchart of a synchronization protocol for synchronizing controllers in accordance with an embodiment of the present invention.

FIG. 7 illustrates flowchart 700 of one method for performing the synchronization protocol referred to above in reference to steps 504 and 520 in FIG. 5. A synchronization protocol such as the one described herein is necessary to handle controllers that are not available to receive state change information because they are powered off or otherwise disconnected from network 106 when such state change information is transmitted. As will be appreciated by persons skilled in the relevant art(s) based on the teachings provided herein, the ability to synchronize in accordance with protocol 700 depends, in part, on each controller having synchronized clocks. To the extent there is clock skew between controllers, this may be compensated for upon connectivity.

The method of flowchart 700 will be described with reference to a first controller 102a and a second controller 102b, wherein controller 102a has requested synchronization. As noted above, in an embodiment, controller 102a requests synchronization shortly after power-up.

Synchronization is initiated at step 702. At step 704, first controller 102a transmits information to second controller 102b relating to one or more events, or state changes, that have occurred since the last synchronization with controller 102b. In an embodiment, this step entails transmitting a log of all events that have been recorded by controller 102a since the last synchronization with controller 102b. At step 706, first controller 102a receives information from second controller 102b relating to one or more events that have occurred since the last synchronization with controller 102a. In an embodiment, this step entails receiving a log of all events that have recorded by controller 102b since the last synchronization with controller 102a. It is anticipated that, in most instances, the aforementioned dialog between controllers will be one way, since the controller that was powered off will not have any state changes to report.

In an embodiment, the event logs that are exchanged between controllers are optimized by each controller through the omission of overwriting operations from the logs. For example, if a log includes a first entry that indicates that a certain TV has been turned on and a second entry that indicates that the same TV has been turned off, then the former entry is unnecessary and is therefore deleted from the log.

At step 708, controller 102*a* determines if any events have been received from controller 102*b*. If no events have been received, then the synchronization protocol terminates at step 722. However, if one or more events have been received, then controller 102*a* examines a received event, as shown at step 710. Controller 102*a* then determines if the received event conflicts with any previously logged event. In a situation where only controller 102*a* has been powered down and controller 102*b* is completely current in terms of system state, it is anticipated that no conflicts will occur and all received entries will be accepted.

However, a conflict may occur where both controllers have generated new state changes but were otherwise unable to synchronize. For example, controller 102*a* may have been used to grant a particular user access to a particular device while controller 102*b* was powered down. Controller 102*a* may then have been powered down and controller 102*b* powered up and used by the same or another user to obtain access to and control the same device. Such a circumstance would give rise to a conflict between the unsynchronized controllers 102*a* and 102*b*. In a case where a conflict such as this occurs, the event associated with the more recent timestamp prevails. Thus, for example, if controller 102*a* includes a new log entry reflecting that the state of a certain TV was set to "on" at 9:42:30 and controller 102*b* includes a new log entry reflecting that the state of the same TV was set to "off" at 9:59:10, then controller 102*a* will accept the stage change from controller 102*b*, but controller 102*b* would reject the change from controller 102*a*, resulting in a mutually consistent state.

This functionality is illustrated at step 712, wherein controller 102*a* determines if the received event conflicts with a previously logged event. If not, then controller 102*a* accepts the received event as shown at step 716 and enters the state change information into its event log 416. If a conflict is identified, then controller 102*a* determines if the previously logged event is associated with a later time stamp than the received event, as shown at step 714. If so, then controller 102*a* accepts the received event as shown at step 716. If not, then controller 102*b* does not accept the received event, as shown at step 718.

In accordance with an embodiment of the invention, accepting state change information as shown at step 716 also includes application of state variable changes as well as the addition, deletion, or modification of various user settings, device modules, or controller/device/system configurations. In an embodiment, the user of controller 102*a* may be prompted to confirm any such additions, deletions or modifications before they are applied.

After a received event has either been accepted at step 716 or rejected at step 718, controller 102*a* determines if there are any more received events to analyze, as shown at step 720. If there are, then the protocol continues with the analysis of the next received event at step 710. Otherwise, the synchronization protocol is terminated as shown at step 722.

With regard to the foregoing protocol, note that controller 102*a* may comprise a newly-introduced unit having no recorded prior synchronization time, or having a prior synchronization time that is earlier than the time-stamp associated with each of the events received from controller 102*b*. In an embodiment, this situation is handled by ignoring the received event log entirely and instead, just propagating the complete configuration state from controller 102*b* to controller 102*a*.

Through the synchronization protocols described above, each controller 102*a* through 102*n* in device control system 100 can update device state information and inform its respective user of the current state of the various electronic devices 104*a* through 104*n* in a common control area.

Moreover, the synchronization methods of the present invention may also be used to allow controllers to update device control database information. For example, when a user desires to add a new controller or replace an old controller with a new one, the new controller can be easily configured to control the electronic devices in the control environment. Specifically, the databases of an existing controller can be transferred over a network, such as a wireless network, to the new controller by implementing a synchronization operation in accordance with an embodiment of the invention.

In accordance with an embodiment of the present invention, the synchronization protocol may also be used to propagate device control libraries, such as device control libraries comprising executable code, from one controller to another. Such functionality may be particularly useful in Java-based systems.

D. Migration from Peer-to-Peer to Client-Server Mode in Accordance with an Embodiment of the Present Invention In accordance with an embodiment of the present invention, a controller 102 can be migrated from a stand-alone mode to a client-server environment in which the controller, and other such controllers, serves as a client, or user interface, to a central server 108 that stores the essential operational firmware and database.

When a central server 108 is added to network 106, the databases of a controller 102 can be synchronized with central server 108 allowing updated data on controller 102 (now a client) to be added to the corresponding database of control server 108. In the client-server mode of operation, each controller 102*a* through 102*n* acts as a user interface for control server 108. For example, each controller 102*a* through 102*n* forwards control requests of the user to control server 108 for execution and obtain GUI information from control server 108.

As part of the discovery process discussed in the previous section, controller 102 may discover the presence of control server 108 on network 106. This is an indication that the infrastructure has migrated from a peer-to-peer environment to a client-server environment. In this mode, controller 102 largely functions as a user interface terminal, with all user and device configuration information, device control modules, and state variables stored on control server 108.

When controller 102 detects control server 108 for the first time, it must determine whether to send all or some of its configuration data to control server 108. This may be accomplished using a protocol similar to the synchronization protocol described in the previous section. If controller 102 and control server 108 have synchronized previously, controller 102 sends only events that have been logged since that synchronization time. If controller 102 and control server 108 have never been synchronized, then controller 102 sends its entire configuration to control server 108. The process is unidirectional: control server 108 does not send any updates to controller 102. After the synchronization is complete, controller 102 voids its configuration and switches to a client-server mode, where it will contact control server 108 for any information or to transmit any commands.

In the embodiment discussed above, the migration from a stand-alone mode to a client-server environment is automatically initiated when the presence of control server 108 is detected on network 106. However, in an alternate embodiment, initiation of the migration is user-prompted as opposed to automatic. Such an embodiment accommodates a situation in which a user prefers to retain peer-to-peer operation even when a control server is detected on the network. As a result, a peer-to-peer environment may exist even if a control server is present on the network. User-prompted control of the migration process may include inputting one or more commands to a controller or other device communicatively coupled to network 106. In an embodiment, the user prompts the system to simply override or ignore the control server until such time as the user decides to switch over to the server-based system.

In an alternate embodiment, the user is provided with the ability to terminate an automatically-initiated migration process from a peer-to-peer to server-based environment in order to maintain peer-to-peer operation.

In accordance with a further embodiment of the present invention, one or more controllers 102 can be also migrated from a client-server environment, such as the environment described above, to a peer-to-peer or stand-alone mode. In such an embodiment, central server 108 is configured to download state change data to at least one of controller for synchronization purposes prior to central server 108 being removed from network 106 or otherwise rendered unavailable to the controllers. The controller that receives the state change data is configured to then engage in a peer-to-peer synchronization protocol, such as the protocol described elsewhere herein, to transfer the state change data to all other controllers. In order to implement such a system, it is assumed that each controller has sufficient capacity, including adequate memory, to receive and use the downloaded data.

E. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for migrating a controller adapted to remotely control one or more electronic devices from a stand-alone mode to a client-server mode, wherein the controller remotely controls the one or more electronic devices in accordance with a control configuration maintained by the controller in the stand-alone mode, the method comprising:
    discovering a server that is communicatively coupled to the controller and the one or more electronic devices;
    transmitting data to said server relating to the control configuration maintained by the controller;
    updating a control configuration maintained by said server based on said transmitted data; and
    subsequently controlling the one or more electronic devices in the client-server mode, wherein controlling the one or more electronic devices in the client-server mode comprises issuing commands by said server directly to the one or more electronic devices in accordance with said updated control configuration maintained by said server.

2. The method of claim 1, wherein said transmitting comprises transmitting data to said server relating to one or more events that have occurred since a prior synchronization with said server.

3. The method of claim 1, wherein said transmitting comprises transmitting data to said server relating to the control configuration maintained by the controller in response to user input.

4. The method of claim 1, wherein discovering said server comprises:
    transmitting a query message; and waiting a predetermined amount of time to receive a reply to said query message.

5. An apparatus for remotely controlling one or more electronic devices, comprising:
    a network interface adapted for communication over a network;
    a user interface adapted to receive user input; and
    control logic coupled to said network interface and said user interface and adapted to execute commands in response to said user input;
    wherein said control logic is further adapted to discover a server that is communicatively coupled to said network and to the one or more electronic devices and to transmit data to said server relating to a control configuration maintained by the apparatus and used by the apparatus to remotely control the one or more electronic devices in a stand-alone mode, and
    wherein said server is adapted to update a control configuration maintained by said server based on said transmitted data and to subsequently control the one or more electronic devices in a client-server mode by issuing commands directly to the one or more electronic devices in accordance with said updated control configuration maintained by said server.

6. The apparatus of claim 5, wherein said network interface comprises a transceiver.

7. The apparatus of claim 6, wherein said transceiver is adapted for communication in accordance with an IEEE 802.3 Ethernet protocol.

8. The apparatus of claim 6, wherein said transceiver is adapted for wireless communication in accordance with a Bluetooth protocol.

9. The apparatus of claim 6, wherein said transceiver is adapted for wireless communication in accordance with an IEEE 802.11 protocol.

10. The apparatus of claim 5, wherein said control logic is adapted to transmit data to said server relating to one or more events that have occurred since a prior synchronization with said server.

11. The apparatus of claim 5, wherein said control logic is adapted to transmit data to said server relating to a control configuration maintained by the apparatus in response to user input.

12. The apparatus of claim 5, wherein said control logic is adapted to discover said server by transmitting a query message via said network interface and waiting a predetermined amount of time to receive a reply to said query message.

13. A system, comprising:
    an electronic device;
    a controller communicatively coupled to said electronic device via a network, said controller adapted to remotely control said electronic device via said network in accordance with a control configuration maintained by said controller in a stand-alone mode; and
    a server communicatively coupled to said electronic device and said controller via said network;
    wherein said controller is further adapted to discover said server and to transmit data to said server relating to said control configuration maintained by said controller, and
    wherein said server is adapted to update a control configuration maintained by said server based on said transmitted data and to subsequently control said electronic device in a client-server mode by issuing commands directly to the electronic device in accordance with said updated control configuration maintained by said server.

14. The system of claim 13, wherein said network comprises a wireless local area network.

15. The system of claim 13, wherein said controller is communicatively coupled to said network via an IEEE 802.11 link.

16. The system of claim 13, wherein said controller comprises one of a personal digital assistant or a web pad.

17. The system of claim 13, wherein said electronic device comprises one of a computer, a computer peripheral, a television, a video cassette recorder, a digital versatile disc player, a personal video recorder, a compact disc player, a stereo receiver, an electronic thermostat, a UPnP digital media renderer and/or server, a lamp, or a video camera.

18. The system of claim 13, wherein said controller is adapted to transmit data to said server relating to one or more events that have occurred since a prior synchronization with said server.

19. The system of claim 13, wherein said controller is adapted to transmit data to said server relating to a control configuration maintained by said controller in response to user input.

20. The system of claim 13, wherein said controller is adapted to discover said server by transmitting a query message over said network and waiting a predetermined amount of time to receive a reply to said query message.

21. A method for migrating from a client-server mode in which a server remotely controls one or more electronic devices in accordance with a control configuration maintained by the server, to a stand-alone mode in which a controller remotely controls the one or more electronic devices in accordance with a control configuration maintained by the controller, the method comprising:
receiving data from said server relating to the control configuration maintained by the server;
updating the control configuration maintained by the controller based on the received data; and
subsequently controlling the one or more electronic devices in the stand-alone mode, wherein controlling the one or more electronic devices in the stand-alone mode comprises issuing commands by the controller directly to the one or more electronic devices in accordance with said updated control configuration maintained by the controller.

22. The method of claim 21, further comprising:
transmitting a copy of said data received from said server to a second controller.

23. An apparatus for remotely controlling one or more electronic devices, comprising:
a network interface adapted for communication over a network;
a user interface adapted to receive user input; and
control logic coupled to said network interface and said user interface and adapted to execute commands in response to said user input;
wherein said control logic is further adapted to receive data from a server communicatively coupled to said network and to the one or more electronic devices, said received data relating to a control configuration maintained by said server and used by said server to control the one or more electronic devices in a client-server mode, to update a control configuration maintained by the apparatus based on said received data, and to subsequently control the one or more electronic devices in a stand-alone mode by issuing commands directly to the one or more electronic devices in accordance with said updated control configuration maintained by said apparatus.

24. The apparatus of claim 23, wherein said control logic is further adapted to transmit a copy of said data received from said server to a second apparatus communicatively coupled to said network.

25. A system, comprising:
an electronic device;
a controller communicatively coupled to said electronic device via a network; and
a server communicatively coupled to said electronic device and said controller via said network, said server adapted to remotely control said electronic device via said network in accordance with a control configuration maintained by said server in a client-server mode;
wherein said controller is adapted to receive data from said server relating to said control configuration maintained by said server, to update a control configuration maintained by said controller based on said received data, and to subsequently control said electronic device in a stand-alone mode by issuing commands directly to the electronic device in accordance with said updated control configuration maintained by said controller.

26. The system of claim 25, wherein said controller is further adapted to transmit a copy of said data received from said server to a second controller communicatively coupled to said network.

* * * * *